(12) United States Patent
Goldstein et al.

(10) Patent No.: US 8,711,030 B2
(45) Date of Patent: Apr. 29, 2014

(54) SINGLE-PASS BARANKIN ESTIMATION OF SCATTERER HEIGHT FROM SAR DATA

(75) Inventors: Gene Barry Goldstein, Woodland Hills, CA (US); Matthew Paul Rosinski, Tucson, AZ (US); Michael Wayne Whitt, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 277 days.

(21) Appl. No.: 13/355,547

(22) Filed: Jan. 22, 2012

(65) Prior Publication Data

US 2013/0106651 A1 May 2, 2013

Related U.S. Application Data

(60) Provisional application No. 61/553,216, filed on Oct. 30, 2011.

(51) Int. Cl.
*G01S 13/90* (2006.01)
*G01S 7/41* (2006.01)

(52) U.S. Cl.
USPC .............. 342/25 F; 342/90; 342/180

(58) Field of Classification Search
CPC ...................................... G01S 90/35
USPC ...................................... 342/25 F
See application file for complete search history.

(56) References Cited

U.S. PATENT DOCUMENTS

| 5,448,241 A * | 9/1995 | Zeoli et al. ............ 342/25 A |
| 6,150,972 A * | 11/2000 | Bickel et al. ........... 342/25 C |
| 2012/0019410 A1 * | 1/2012 | Ferretti et al. .......... 342/25 C |

OTHER PUBLICATIONS

Jiang et al. "Barankin Bound for Bearing Estimation with Bias Correction". Oceans 2008—MTS/IEEE Kobe Techno-Ocean, Apr. 8-11, 2008. pp. 1-5.*
McAulay et al. "Barankin Bounds on Parameter Estimation". IEEE Transactions on Information Theory. vol. IT-17, No. 6. Nov. 1971. pp. 669-676.*
E.W. Barankin, "Locally Best Unbiased Estimates," The Annals of Mathematical Statistics, vol. 20, No. 4, (Dec. 1949), pp. 477-501.
Mark A. Richards, "A Beginner's Guide to Interferometric SAR Concepts and Signal Processing," IEEE A&E Systems Magazine vol. 21, No. 6 Jun. 2006 Part 3: Tutorials—Richards, pp. 5-29.
Mita D. Desai, "Spolight Mode SAR Stereo Technique for Height Computation," IEEE Transactions on Image Processing, vol. 6, No. 10, Oct. 1997, pp. 1400-1411.

* cited by examiner

*Primary Examiner* — Matthew M Barker
(74) *Attorney, Agent, or Firm* — Eric A. Gifford

(57) ABSTRACT

Traditional multi-pass radar techniques are not suitable for missions in which the aerial platform both identifies and prosecutes the target at termination of a single pass. A single pass method running a Barankin Estimator provides target height and variance for 3D target imaging that is suitable for war fighters, missiles, UAV, and other aerial platforms capable of nonlinear flight paths.

19 Claims, 8 Drawing Sheets

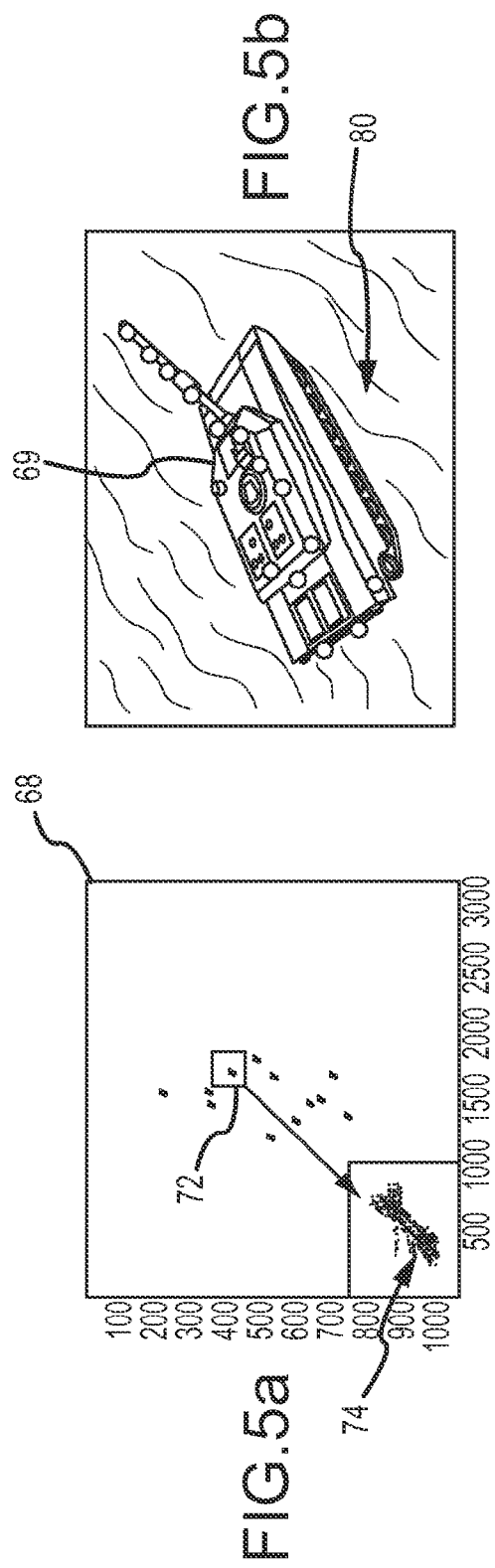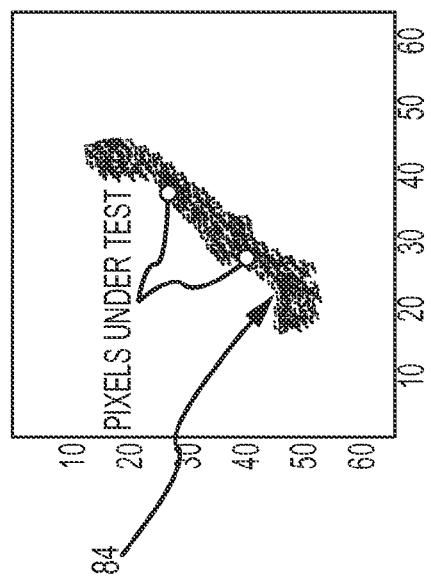
FIG.5a
FIG.5b
FIG.5c

US 8,711,030 B2

SINGLE-PASS BARANKIN ESTIMATION OF SCATTERER HEIGHT FROM SAR DATA

CROSS-REFERENCE TO RELATED APPLICATIONS

This application claims benefit of priority under 35 U.S.C. 119(e) to U.S. Provisional Application No. 61/553,216 entitled "Barankin Estimation of Scatterer Height from SAR Data" and filed on Oct. 30, 2011, the entire contents of which are incorporated by reference.

BACKGROUND OF THE INVENTION

1. Field of the Invention

This invention relates to 3D target imaging using radar, and more particularly to the use of Barankin Estimation to generate 3D target information in a single radar pass.

2. Description of the Related Art

Target identification during reconnaissance or within the theater-of-battle has long been a topic of interest in remote sensing. In radar Automatic Target Recognition (ATR), two-dimensional synthetic aperture radar (2D SAR) image formation has been used to render target signatures that are processed by ATR for identification. Such images are a projection of three-dimensional targets into a 2D imaging plane, typically resulting in a sacrifice of target height information. ATR signature processing consists of 2D target signature feature analysis. Recovering the third dimension, target height, and introducing it into ATR methods should improve identification performance.

Recently, 3D target imaging using radar has received funding in order to improve situational awareness and target identification in the theater of battle. Traditional 3D imaging requires multiple radar passes, as in interferometry or stereo SAR. In interferometry, the multiple pass set consists of a sequence of individual passes that are flown almost identically to one another, during SAR imaging, differing only by platform altitude from pass to pass. The multiple pass set is processed jointly by an interferometric algorithm that exploits the height difference between the passes to derive target height information (M. Richards; *A Beginners Guide to Interferometric SAR Concepts and Signal Processing*—IEEE Aerospace and Electronics Systems magazine, Tutorial Issue IV, vol. 22, no. 9, p. 5-29, September 2007). In stereo SAR, a pair of passes is typical where the first pass is right or left looking during SAR imaging, and the second pass look direction is opposite the first pass. It is common for both passes to intersect the same navigation way-point at the middle of their respective SAR imaging periods. A stereo SAR algorithm then processes the image pair exploiting layover differences between the images to obtain target height information (M. Desai; *Spotlight mode SAR stereo technique for height computation*—IEEE Image Processing, Issue X, vol. 6, p. 1400-1411, October 1997).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

Traditional multi-pass radar techniques to form 3D target signatures are suitable for reconnaissance missions but are not suitable for missions in which the aerial platform both identifies and prosecutes the target at termination of a single pass. This invention proposes a single pass method that runs a Barankin Estimator to provide target height information for 3D target imaging that is suitable for war fighters, missiles, UAV, and other aerial platforms capable of nonlinear flight paths.

In an embodiment, a computer-implemented method of estimating 3D target information comprises collecting coherent radar data while flying an aerial platform in a nonlinear flight path with nonzero acceleration out of the slant plane while imaging a ground-based target and forming a two-dimensional synthetic aperture radar (SAR) image from the radar data using a phase-preserving technique. The ground-based target is identified and masked in the 2D SAR image to identify target pixels. The method determines a zero height reference plane that supports the target. The method derives a vector of complex-valued time samples associated with one of the target pixels. The method runs a Barankin Estimator on the vector of complex-valued time samples to provide a Barankin estimate $\hat{\alpha}_B$ of a quadratic phase parameter $\alpha$ and scales the Barankin estimate $\hat{\alpha}_B$ to a pixel height z relative to the zero height reference plane to provide 3D target information for the target pixel under test. The variance of the Barankin estimate is also computed, given by $\sigma_\alpha^2$. The Barankin estimator provides 3D target information in a single radar pass so that the aerial platform may prosecute the target at termination of the pass.

In different embodiments, the zero height reference plane may be determined from a priori target information, an in-scene reflector or by processing clutter pixels to estimate a clutter phase compensation vector and applying the vector to both the clutter pixels and target pixels to establish the zero height reference plane.

In an embodiment, running the Barankin Estimator comprises setting upper and lower limits on the quadratic phase parameter $\alpha$, defining Q tessellation points spaced between the upper and lower limits on the quadratic phase parameter $\alpha$, and evaluating a specialized auxiliary function G and computing its inverse $G^{-1}$. If the inverse auxiliary function is not stable, the tessellation points are adjusted and the process is repeated until stability is achieved. Once the inverse function stabilizes, the Barankin Estimator produces the Barankin estimate from which a variance can be computed.

In an embodiment, the Barankin Estimator is run iteratively until reaching a stopping criterion such as a maximum number of iterations or a convergence criteria on the Barankin estimate $\hat{\alpha}_B$.

In another embodiment, the Barankin estimator is applied to multiple unresolved target pixels to generate multiple pixel heights z and overcome pixel interference.

In another embodiment, the single-pass Barankin Estimator may be applied to an aerial vehicle that makes multiple passes along nonlinear flight paths while imaging the target. The computer runs the Barankin Estimator on each pass to generate pixel heights z and combines the pixel heights between passes to form a final pixel height estimate.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a through 5e are diagrams illustrating the steps of identifying a target and creating a mask, target height calibration and the inverse FFT of target pixels;

DETAILED DESCRIPTION OF THE INVENTION

Traditional multi-pass radar techniques to form 3D target signatures are suitable for reconnaissance missions but are not suitable for missions in which the aerial platform both identifies and prosecutes the target at termination of a single pass. This invention proposes a single pass method that runs a Barankin Estimator to provide target height information for 3D target imaging that is suitable for war fighters, missiles, UAV, and other aerial platforms capable of nonlinear flight paths. The invention applies optimum mean-square-error (MSE) principals and Barankin theory to derive a Barankin Estimator capable of generating target 3D information from a single radar pass.

Figure 1:
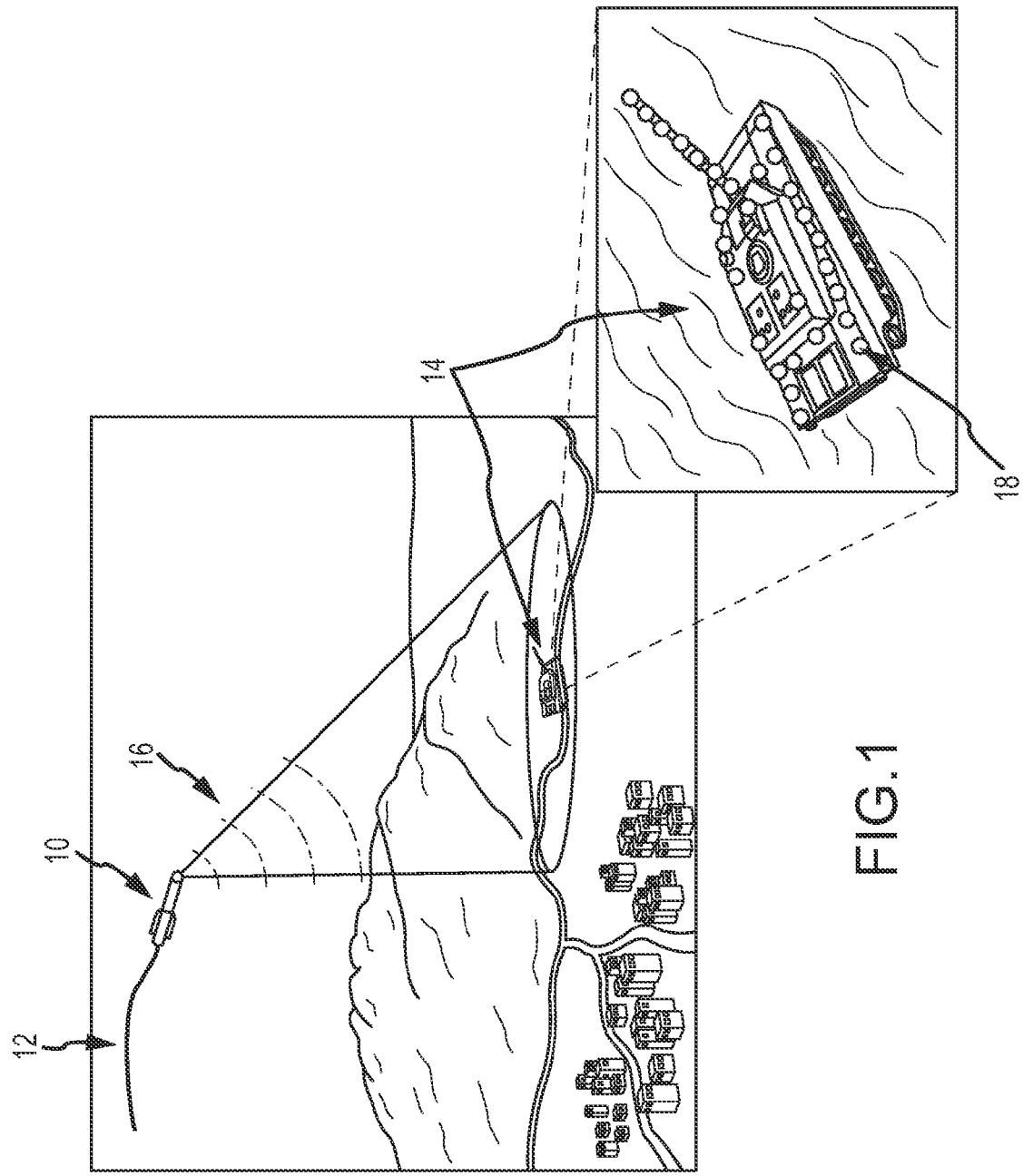
FIG. 1 is a diagram of an aerial platform that illuminates a target with radar pulses in a single pass to generate a SAR image and runs a Barankin Estimator to estimate target heights to render a 3D target signature.

As shown in FIG. 1, in an embodiment an aerial platform 10 flies in a nonlinear flight path 12 with nonzero acceleration out of the slant plane while imaging a ground-based target 14. The platform's radar transmits and receives RF pulses 16 to collect data and form a SAR image. From the SAR image, the platform's processing resources select target pixels 18 (e.g. scatterers) and run a Barankin Estimator on the target pixel data to estimate their pixel height 'z' values from a single radar pass. The platform's processing resources store the z values in (x,y,z) to render a 3D target signature for Automatic Target Recognition or Precision Aimpoint.

Figure 2:
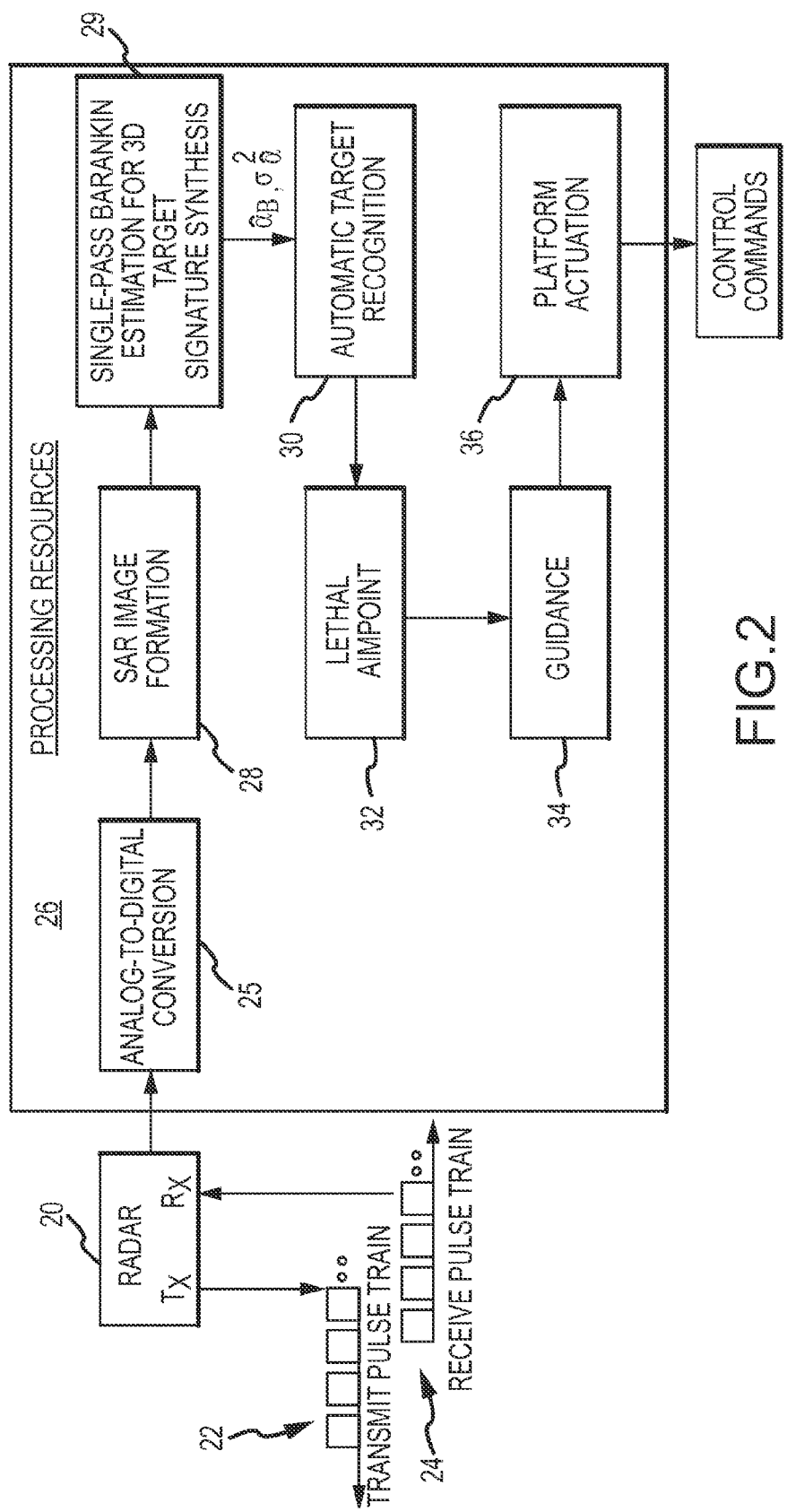
FIG. 2 is a block diagram of an embodiment of on-board processing on the aerial platform.

As shown in FIG. 2, in an embodiment the aerial platform includes a radar Tx/Rx 20 that transmits a pulse train 22 and receives a pulse train 24 reflected off the ground-based target to collect coherent radar data (i.e. data with phase coherency) and pass the analog pulses through an Analog-to-Digital conversion 25 to produce digital radar samples and processing resources 26 (e.g. one or more processing units and memory units) that process pulse train 24 to generate the 2D SAR image, run the Barankin Estimator to provide 3D information and then use the 3D information to actuate the platform to prosecute the target. Processing resources 26 process the digital radar samples to form a complex SAR image 28 using a phase-preserving algorithm. Processing resources 26 run a Barankin Estimator 29 on target pixels extracted from the complex SAR image to provide target height "z" values from a single radar pass to render a 3D target signature. ATR 30 accepts the 3D target signature along with height estimation variance information and determines target type and pose by analyzing the signature's features. Lethal Aimpoint 32 utilizes target type and pose information to compute the optimum impact point. In turn, Guidance 34 determines the required flight path to reach the point of impact and Platform Actuation 36 computes and sends the control commands necessary to manipulate aerodynamic control surfaces (e.g. fins, canards etc.) and achieve the required flight path to intercept the target.

The Barankin Estimator 29 provides an estimate of the height of a single scatterer (target pixel) imaged from radar data in which the Barankin estimate is considered minimum in the mean-square-error (MMSE) sense. The scatterer is assumed to be of high signal-to-noise ratio relative to surrounding scatterers, as for bright responses on stationary ground targets, or as for corner reflectors. The Barankin Estimator is applied to a series of point scatterers on a stationary ground target to construct a 3D representation of the target. The Barankin Estimator uses single-pass radar data that has been collected with known nonzero platform acceleration, and that has been processed using synthetic aperture radar (SAR) image formation.

Equation 1 scales a quadratic phase parameter ($\alpha$) by known radar parameters including platform acceleration ($a_z$) out of the slant plane to provide scatterer height (z). The Barankin Estimator provides a Barankin estimate $\hat{\alpha}_B$ of quadratic phase parameter $\alpha$ from a target pixel, and solves for its 3D height, z, using this equation. In order to obtain a unique height solution from Equation 1, a nonzero platform acceleration is required.

$$\frac{\alpha}{4} = \left(\frac{\lambda}{2 \cdot \pi \cdot \rho_{az}^2}\right) \cdot \frac{R_{AC} \cdot a_z}{[V_p \cdot \cos\theta_{sq}]^2} \cdot z \qquad \text{Equation 1}$$

where
- $\Theta_{sq}$=Squint angle, relative to broadside
- $\lambda$=Wavelength at the center of the Tx bandwidth
- $V_p$=Platform Speed
- $a_z$=Component of platform acceleration that is out of the slant plane
- $\rho_{az}$=Fully focused cross-range resolution when z=0
- z=Height of scatterer normal to, and relative to the focus plane
- $R_{ac}$=The distance between the ARP (aperture reference point) and the CRP (coherent reference point)

Equation 2 defines an estimator's MSE as the sum of its squared bias and its variance (A. Papoulis; *Probability, Random Variables, and Stochastic Processes*, p. 177-178, p. 106-107).

$$\text{MSE}=\beta^2+\sigma^2 \qquad \text{Equation 2}$$

It is assumed that the pixel under test is of relatively high SNR with respect to surrounding scatterers, and thus dominates the estimation outcome if competing scatterers are interfering. The terms "target pixels" and "scatterers" are considered for this application as being equivalent terminology. Consequently pixels may interfere so long as one pixel is of relatively high SNR. While beneficial, high absolute SNR is not required since the Barankin Estimator accounts for SNR in its formulation.

The new estimator in Equation 3, developed within the Barankin framework for 3D target imaging, enables minimization of Equation 2 and is used to develop an expression for the estimator's variance, shown in Equation 4. The generalized variance is evaluated by substituting the estimated alpha for the true alpha value, $\alpha$. The dummy variable $\alpha_*$ represents the true parameter value in Equation 4.

$$\hat{\alpha}_B(X; \alpha_o) = \alpha_o + \sum_{q=1}^{Q} J_q \cdot \Pi_q(X; \alpha_o) \qquad \text{Equation 3}$$

$$\sigma_{\hat{\alpha}}^2(X; \alpha_o) = J^+ \cdot \Gamma \cdot J - (\alpha_o - \alpha_*)^2 \big|_{\alpha_* = \hat{\alpha}_B(X;\alpha_o)} \qquad \text{Equation 4}$$

where $^+$ represents a conjugate-transpose operator and
- J=Lagrangian Multipliers
- $J^+$=Complex conjugate of the Lagrangian Multipliers
- $\Gamma$=General Auxiliary Function
- $\alpha_0$=Local Optimization Point (LOP)

Π=Ratio of Densities where $\alpha_q$=Tessellated parameter values
X=Measurements of complex-valued time samples
q=Tessellation Index
Q=Number of Tessellation Points In an embodiment, running the Barankin Estimator produces the Barankin estimate $\hat{\alpha}_B$ that is an approximately local MMSE solution. The method runs the Barankin Estimator iteratively until reaching a stopping criterion such as a maximum number of iterations or a convergence criteria on the Barankin estimate $\hat{\alpha}_B$.

In another embodiment, the Barankin estimator is applied to multiple unresolved target pixels to generate multiple pixel heights z. Although the formulation of the Barankin Estimator is directed to sequential single pixel parameter estimation to build a 3D signature, the formulation can be expanded to address multiple unresolved-pixel height estimation. Multiple unresolved-pixel estimation has particular significance when adjacent pixels interfere with one another. The presence of competing pixels is possible since a induces a 'smearing' effect that tends to undermine the isolation of adjacent scatterers. Still, for the category of 'bright' target scatterers the single-pixel Barankin Estimator offers a robust estimation method for height. Multiple-unresolved pixel height estimation using an expanded Barankin formulation would relax the requirement for high relative SNR because the additional degrees-of-freedom within the estimator would be used to resolve underlying scatterer information.

In another embodiment, the single-pass Barankin Estimator may be applied to an aerial vehicle (such as a reconnaissance vehicle) that makes multiple passes along nonlinear flight paths while imaging the target. The computer runs the Barankin Estimator on each pass to generate pixel heights z and combines the pixel heights between passes to form a final pixel height estimate. Combining estimates through simple averaging represents a basic approach to obtain estimation improvement. Higher fidelity combining approaches would involve pixel registration between radar passes followed by a weighted combination of estimation results performed in (x,y,z) coordinates. The weights would be computed using the variance estimates associated with each Barankin estimate, $\hat{\alpha}_B$.

Figure 3:
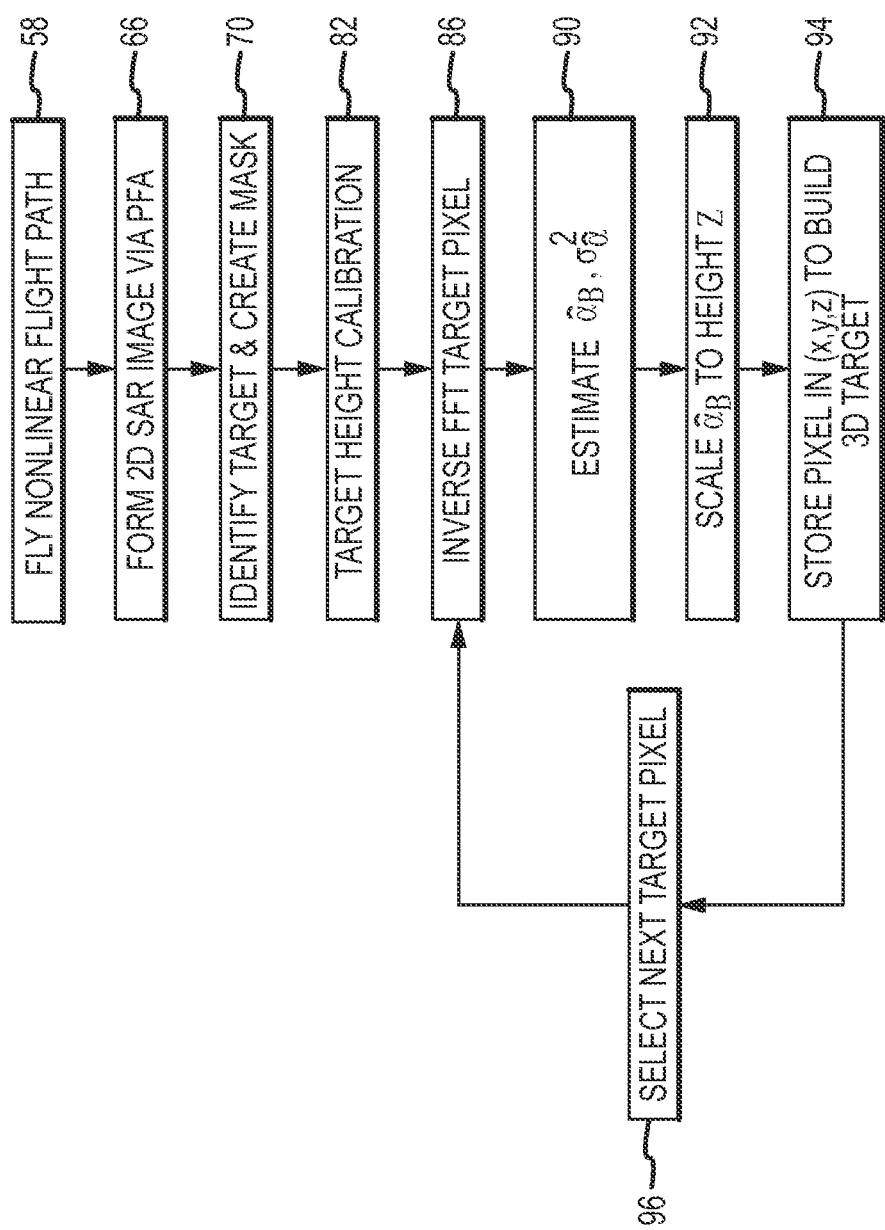
FIG. 3 is a flow diagram of an embodiment of single-pass Barankin Estimation for 3D target signature synthesis.
Figure 4:
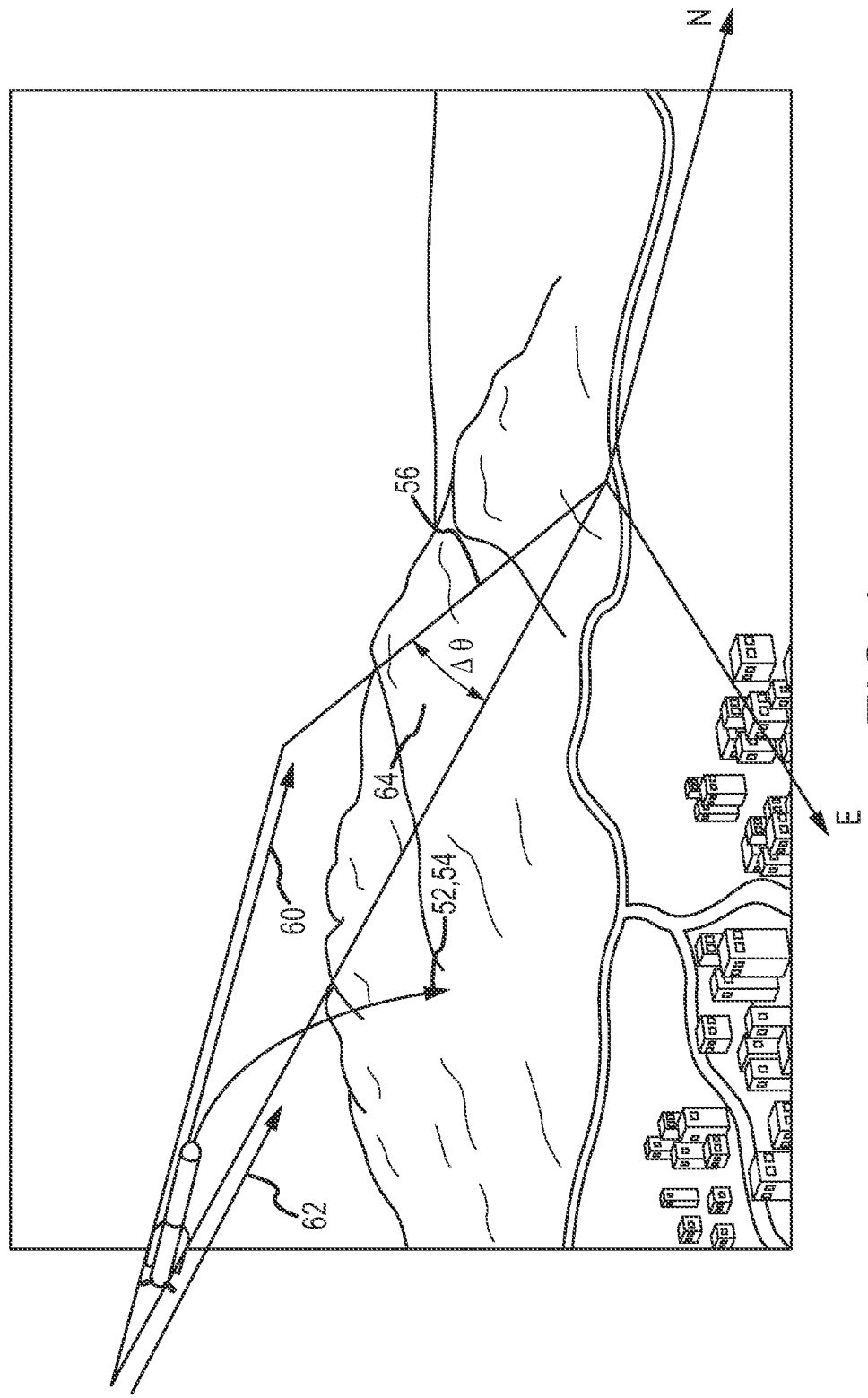
FIG. 4 is a diagram of a flight path with nonzero acceleration out of the slant plane.

Referring now to the flow diagram of FIG. 3 in which a single-pass Barankin Estimator is used to provide 3D target information, the aerial platform flies a nonlinear flight path 52 with nonzero platform acceleration $a_z$ 54 out of the slant plane 56 (step 58) as shown in FIG. 4. To obtain a unique height solution from Equation 1, a nonzero platform acceleration $a_z$ is required. The figure illustrates a downward weapon trajectory, out of the slant plane, to induce the required acceleration. For Ka-band radar, at least 0.5 g's of acceleration out of the slant plane is needed to induce the quadratic term α that will be estimated using the Barankin Estimator. The slant plane 56 is illustrated as a triangle, and contains the radar's mid-dwell velocity vector 60 and line-of-sight-to-CRP vector 62. Different radar bands place different requirements on the acceleration, as implied by the λ dependence in Equation 1.

A second general requirement for the flight path is that it subtends the polar angle necessary to achieve SAR azimuth resolution, $\rho_\alpha$. Equation 5 defines the relationship between azimuth resolution and the polar angle ($\Delta\theta$), where $K_a$ is a Taylor weighting coefficient (W. Carrrara, R. Goodman, R. Majewski; *Spotlight Synthetic Aperture Radar*, p. 20; p. 81-111).

$$\rho_a = \frac{\lambda \cdot K_a}{2 \cdot \Delta\theta} \quad \text{Equation 5}$$

FIG. 4 illustrates the polar angle 64 in the slant plane. Jointly satisfying the acceleration and polar angle requirements is not difficult on either missile or reconnaissance platforms. The circular flight paths, traditionally used in reconnaissance, are well suited to achieve the requirements, as are missile trajectories like that illustrated in FIG. 4.

Referring again to FIG. 3, as the aerial platform flies its nonlinear flight path imaging the target, the platform's processing resources collect samples such as video-phase-history (VPH) samples to form a 2D SAR image 68 as shown in FIG. 5a (step 66) using a phase preserving algorithm such as a polar format algorithm (PFA) (Carrrara, R. Goodman, R. Majewski; *Spotlight Synthetic Aperture Radar*, p. 20; p. 81-111; p. 403-407). The VPH is considered to be motion compensated, complex digital samples output from the radar receiver. When Motion Compensation to a coherent reference point (CRP) hasn't been performed within the radar receiver, it must be explicitly performed on the VPH prior to formation of the SAR image. Image formation using PFA involves the complex resampling of VPH samples into a rectangular format which can then be Fourier transformed to produce a two dimensional SAR image.

Figures 5D, 5E:
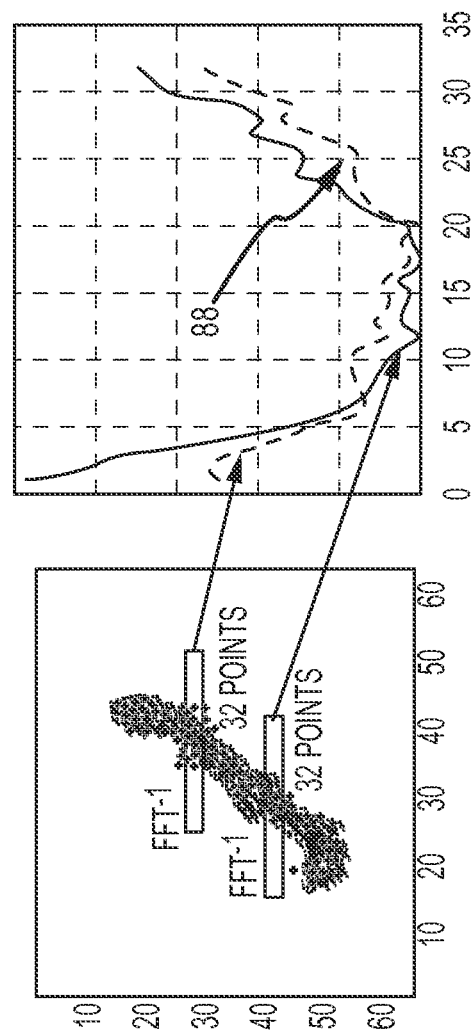

Referring again to FIG. 3, the platform's processing resources identify and mask the ground-based target in the 2D SAR image to identify target pixels on a target of interest (TOI) 69 (step 70.) A TOI is selected for 3D imaging using a bounding box 72 approximately 64×64 pixels in size—the box is shown outlining the TOI in FIG. 5a. The platform's processing resources create a target mask 74 as illustrated in the insert of FIG. 5a. The mask defines the pixels that are 'on the target', and other pixels within the bounding box are assumed to be from clutter, hence "target pixels" and "clutter pixels". The clutter surface under the TOI is assumed to be a level-plane upon which the target rests. Representative data was collected using the proposed accelerated flight path, and contained the desired quadratic phase effect as seen in FIG. 5e. The terrain in this data was flat, and the level-plane assumption was not only satisfied using the 64×64 bounding box, but also with 128×128 and 256×256. Conceptually, terrain containing larger topographic variations may limit the bounding box to 64×64 in order to satisfy the level-plane assumption. The algorithm uses a level-plane assumption because it provides a to pixel's height relative to that plane. In effect, the algorithm uses the underlying clutter surface as a zero height reference plane.

The platform's processing resources establish the zero height reference plane 80 (step 82) that supports the target from a priori information, an in-scene reflector that rests upon the clutter surface or by processing clutter pixels to estimate a clutter phase compensation vector and applying the vector to both the clutter pixels and target pixels to determine the zero height reference plane. In only the latter case, bounding box clutter pixels are needed for target height calibration.

In the latter case, the platform's processing resources achieve target height calibration by using the bounding box clutter pixels to estimate a clutter-based phase compensation vector. The vector is an estimate of all the unwanted phase error that resides on the clutter and target, despite being calculated from only clutter pixels. For linear flight paths, such phase error is due to platform navigation errors, and this error is shared by clutter and target. For nonlinear flight paths the navigation error component is still shared, but clutter may also contain an error component due to the platform acceleration that must be removed from clutter and target to create the zero height reference 80 for the target. The clutter-based phase compensation vector is a 1×64 vector spanning the azimuth dimension (horizontal axis of imagery) and it is applied with a complex multiply, in slow time, for all range bins (vertical axis of imagery), compensating clutter and target within the bounding box.

The slow time dimension is obtained by performing an inverse Fast Fourier Transform (FFT) across the azimuth dimension of the bounding box, for all range bins. This inverse FFT is intrinsic to target height calibration and should not be confused with the target pixel inverse FFT performed in the next step. The slow time application of the clutter phase compensation vector is followed by a forward FFT back to azimuth from slow time. The preceding steps calibrate the target's height relative to the level-plane 80 upon which it rests, doing so without the need for in-scene reflectors or apriori target height knowledge—illustrated in FIG. 5b.

The platform's processing resources perform an inverse-azimuth FFT on a selected target pixel 84 (step 86) to obtain a vector 88 of complex-valued time samples upon which the Barankin estimator will operate to estimate $\alpha$. The number of measurements, $N_v$, equals the inverse-FFT length, which was chosen as 32-points, centered on the pixel under test, but could also have been selected as 16-pnts or 8-pnts, etc. FIGS. 5c through 5e illustrate the operation of these steps. The measurement vector 88 of complex-valued time samples associated with the target pixel is identified as 'X' in Equation 3.

The platform's processing resources run the Barankin estimator to evaluate equations 3 and 4 to provide the Barankin estimate $\hat{\alpha}_B$ of a quadratic phase parameter $\alpha$ for the target pixel and its variance (step 90). The platform's processing resources scale the Barankin estimate $\hat{\alpha}_B$ according to Equation 1 to provide target height z (step 92) and stores the target pixel in 3D coordinates (x,y,z) to build a 3D target signature (where the coordinates of the target pixel in the SAR image provide approximate (x,y)) (step 94). The processing resources select a next target pixel (step 96) and repeat steps 86, 90, 92 and 94. Sequentially processing pixels adds definition to the target signature. Thus, during a single radar pass, the described approach builds a 3D target signature, which allows the aerial platform to prosecute the target with only a single pass. The weapon may impact or otherwise attack the target at the termination of the single pass.

Barankin theory establishes necessary and sufficient conditions required for the existence of an unbiased estimator (UE) for $\alpha$, and provides a framework for obtaining formulae for both the UE and the bound on its performance. The so-called Barankin Bound (BB), is the greatest lower bound (GLB) on the local variance achievable from the class of UE for $\alpha$. Barankin proved that to locally achieve the GLB with the class of UE, the true value of $\alpha$ ($\alpha_*$) must be known apriori. The requirement for truth is unrealistic and for nonlinear estimation problems, like 3D target imaging, UE are not automatically achievable. Since in practice the UE-GLB cannot be assured for the problem of 3D target imaging, the Barankin Estimator performance for 3D target imaging is defined in terms of MMSE as opposed to UE-GLB.

During construction of the Barankin Estimator described in Equations 3 and 4, multiple linear constraints are imposed so that at user defined discrete points the estimator is required to be unbiased. Known as tessellation, there is no guarantee that an estimator exists that satisfies the unbiased constraint at all tessellation points. Fortunately, the Barankin Estimator described in Equations 3 and 4 is designed with tessellation and can be evaluated for its compliance to the tessellation constraints. Evaluation for compliance consists of testing the inverse of the specialized auxiliary function, G (which is mathematically related to the generalized auxiliary function $\Gamma$), to determine if G is ill conditioned (i.e. not invertible). If so, this indicates that the estimator is, in some sense, poorly constrained and tessellation is adjusted to modify constraints and obtain a compliant estimator.

Figure 6:
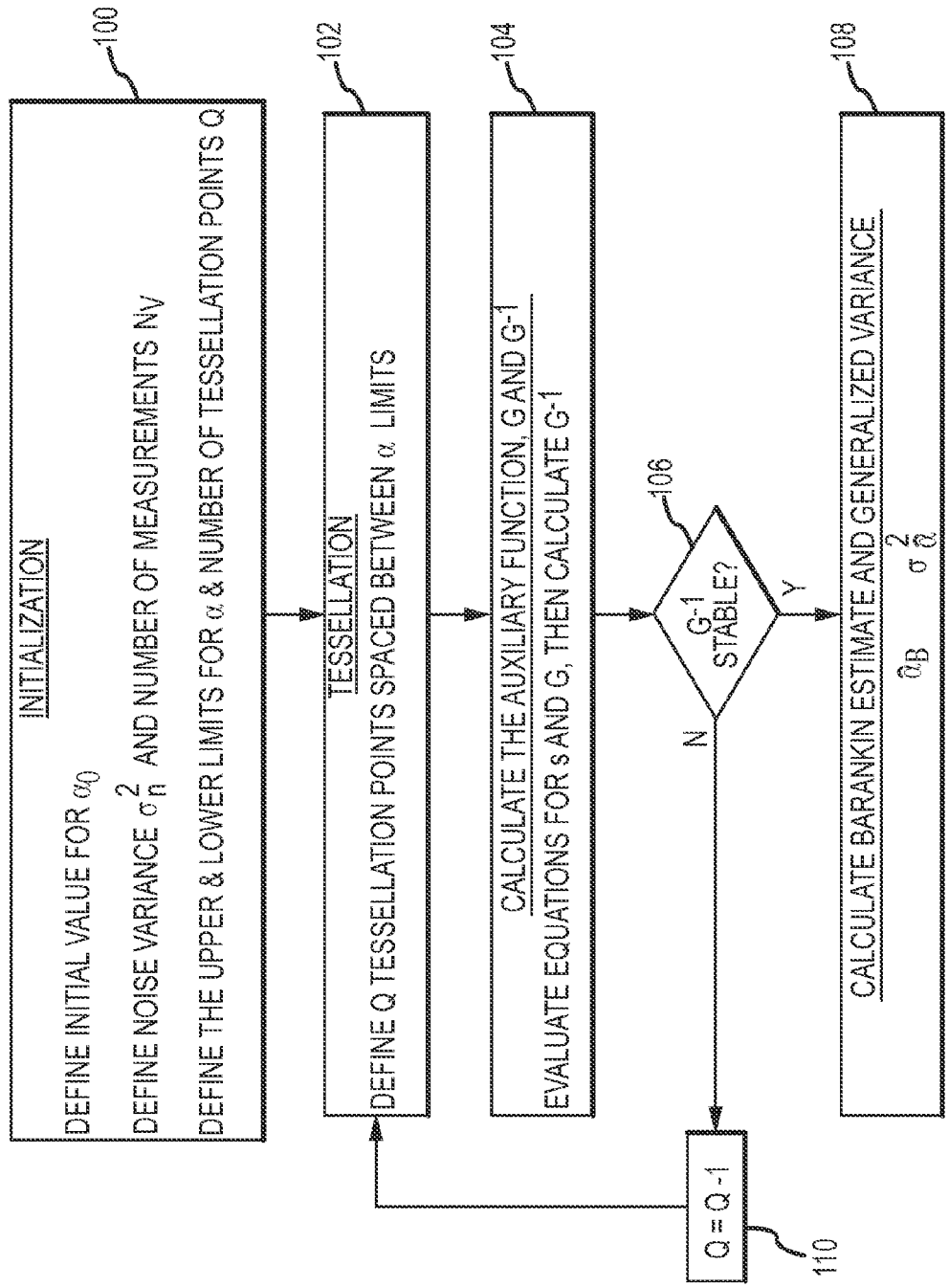
FIG. 6 is a flow diagram of an embodiment for running the Barankin Estimator.

An embodiment for running the Barankin Estimator is illustrated in FIG. 6. The platform's processing resources initializes a number of parameters (step 100) including: local-optimization-point (LOP) $\alpha_0$, noise variance $\sigma^2_n$, the number of measurements $N_v$ (length of vector X), upper and lower bounds for $\alpha^*$, and the number of tessellation points Q. The processing resources perform a tessellation (step 102) defining Q tessellation points spaced between the upper and lower bounds for $\alpha^*$. In an embodiment, initial tessellation for the estimator defines Q uniformly spaced points from the lower to upper bounds of $\alpha_*$. These limits must be known or guessed apriori. The processing resources calculate the inverse of the special auxiliary function G by evaluating equations for s and G (see Appendices A and B) and the calculating $G^{-1}$ (step 104). In step 106, the processing resources test $G^{-1}$ to determine if it is stable (i.e. not ill-condition, invertible). If $G^{-1}$ is stable, the processing resources evaluate Equations 3 and 4 to provide Barankin estimate $\hat{\alpha}_B$ and the estimate of the variance (step 108). If $G^{-1}$ is ill-conditioned, the tessellation points are adjusted to modify the constraints (step 110) and steps 102, 104 and 106 are repeated. In one approach, the Q tessellation points are uniformly spaced between the upper and lower bounds on $\alpha^*$. The points are adjusted by reducing the number of tessellation points, e.g. Q=Q−1, for the next iteration. Another approach would be to randomize the spacing of the tessellation to see if $G^{-1}$ stabilizes. The Barankin Estimator produces a Barankin estimate $\hat{\alpha}_B$ that is approximately MMSE.

The ability to affect the bias and variance components within Eqn. 2 and effectively control MSE, using Barankin's concept of tessellation, is advantageous. For example, lower estimation bias is often achieved by increasing the number of tessellation points at the expense of potentially higher estimator variance. Simulation experiments using different values for Q enable the user to settle upon the best overall operating point for the estimator. The experiments take into account the anticipated range of alpha values and known $\alpha_*$ test points, both of which are varied along with Q to determine the best operating point to achieve MMSE. After setting the MMSE operating point via simulation, the estimator is ready for use on collected coherent radar data.

Given adequate SNR, iteration enables the estimator to progressively converge on its estimate of $\alpha$. For this case, the estimator iteratively reinforces its tessellation constraints that indirectly effect the bias of the final estimate. Although points in between the tessellations are not constrained to zero bias, the bias associated with those points is indirectly constrained by neighboring tessellations by virtue of proximity. In this way, iteration allows the estimator to take full advantage of tessellation constraints. The required SNR to receive the benefits of iteration varies by application but was near 10 dB (image domain) for the experiments. When the iteration completes, a MMSE estimate for $\alpha$ is available with a variance. Allocations for bias and variance within the MSE will have been determined before hand, during the estimator's design in simulation.

Figure 7:
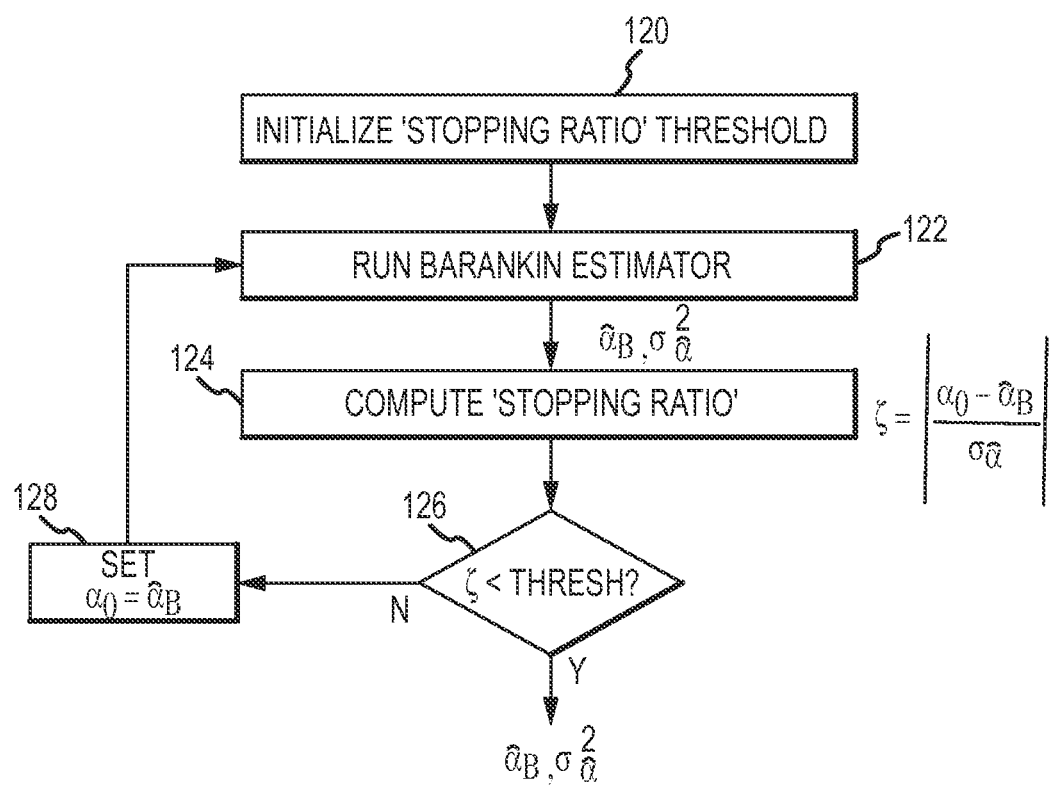
FIG. 7 is a flow diagram illustrating an iterative process for running the Barankin Estimator.

To iteratively run the Barankin Estimator as illustrated in FIG. 7, the platform's processing resources initialize a stopping ratio, ζ, defined in Equation 6 as a function of the current estimate and standard deviation (step 120).

$$\zeta = \left| \frac{\alpha_o - \hat{\alpha}_B}{\sigma_{\hat{\alpha}}} \right| \quad \text{Equation 6}$$

The processing resources run the Barankin Estimator (step 122) to generate a current estimate and variance and compute the stopping ratio, ζ (step 124). The ratio is compared to a threshold (step 126), typically set to 1.0, and if ζ is less than the threshold, then the estimator is finished—otherwise, it iteratively evaluates the estimator by setting $\alpha_o$ equal to the latest estimate $\hat{\alpha}_B$ for (step 128).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

APPENDIX A

Development of Equation 3 for the Barankin Estimator

We wish to locally minimize the mean-square-error (MSE) of our estimator about a local-optimization-point (LOP). Further, the minimization is performed subject to a set of 'Q' linear unbiased constraints, as prescribed by Barankin estimation theory (See E. Barankin; *Locally Best Unbiased Estimates*—The Annals of Mathematical Statistics, Vol. 20, No. 4 (December, 1949), pp. 477-501).

Within Equation-A 1 resides the random process $\hat{\alpha}_B$ (X; $\alpha_o$) which is the Barankin estimator that we seek, given a set of X measurements corrupted by additive-white-Gaussian noise ($\delta_{WGN}$ or AWGN), and given the LOP, $\alpha_o$. The AWGN density function is defined by $p(X; \alpha_o)$.

$$\int_X [\hat{\alpha}_B(X;\alpha_o) - \alpha_o]^2 \cdot p(X;\alpha_o) dX \stackrel{def}{=} F \quad \text{Equation-A 1}$$

$$\text{subject to: } \int_X \hat{\alpha}_B(X;\alpha_o) \cdot p(X;\alpha_q) dX = \alpha_q \quad \text{Equation-A 2}$$

The constraints in Equation-A 2 establish estimator unbiasedness at each of Q tessellation points but not in between tessellation points. Although points in between the tessellations are not constrained to zero bias, the bias associated with those points is indirectly constrained by neighboring tessellations by virtue of proximity.

The measurements, X, are those obtained from step 86 in FIG. 3 "Inverse FFT Target Pixel," and represent complex time samples containing underlying information related to α. The time scale defined for X, identified as v, is normalized between plus and minus one and has dimensions $N_v$ X 1.

$$X = s(\alpha) + \delta_{WGN} \quad \text{Equation-A 3}$$

$$s(v;\alpha) = e^{[-j \cdot 2\pi \cdot \alpha \cdot v^2]}, \text{ with the vector } (-1 \leq v \leq +1) \quad \text{Equation-A 4}$$

Problems involving constrained minimizations are often solved using Lagrangian multipliers from Calculus of Variations (see D. Kirk; *Optimal Control Theory*, p. 163-177). For this, the cost function F, which in this case is the estimator's MSE, is augmented using Lagrangian multipliers, $\overline{\lambda_q}$. Each multiplier scales one of the Q tessellation constraints, and each constraint contains a perturbation term.

$$F = \int_X [\hat{\alpha}_B(X;\alpha_o) - \alpha_o]^2 \cdot p(X;\alpha_o) dX - \quad \text{Equation-A 5}$$

$$2 \cdot \sum_{q=1}^{Q} \overline{\lambda_q} \cdot \int_X [\hat{\alpha}_B(X;\alpha_o) + \varepsilon \cdot \eta(X)] \cdot p(X;\alpha_q) dX$$

The Barankin Estimator is derived by taking the derivative of Equation-A 5 and setting it equal to zero.

$$\frac{\partial F}{\partial \varepsilon} = \quad \text{Equation-A 6}$$

$$\int_X \left\{ [\hat{\alpha}_B(X;\alpha_o) - \alpha_o] \cdot p(X;\alpha_o) - \sum_{q=1}^{Q} \overline{\lambda_q} \cdot p(X;\alpha_q) \right\} \cdot \eta(X)$$

$$dX = 0$$

Now solve for the estimator.

$$\hat{\alpha}_B(X;\alpha_o) = \alpha_o + \sum_{q=1}^{Q} \overline{\lambda_q} \cdot \frac{p(X;\alpha_q)}{p(X;\alpha_o)} \quad \text{Equation-A 7}$$

Define more convenient variables for compact representation of Equation-A 7.

$$J_q \stackrel{def}{=} \overline{\lambda_q} \text{ dimensions } (Q \times 1) \quad \text{Equation-A 8}$$

$$\Pi_q(X;\alpha_o) = \frac{p(X;\alpha_q)}{p(X;\alpha_o)} \text{ dimensions } (1 \times Q) \quad \text{Equation-A 9}$$

$$\hat{\alpha}_B(X;\alpha_o) = \alpha_o + \sum_{q=1}^{Q} J_q \cdot \Pi_q(X;\alpha_o) \quad \text{Equation-A 10}$$

Equation A-10 provides the Barankin Estimator given in Equation 3.

APPENDIX B

Development of Equation 4 for the Generalized Variance

The development for the Barankin estimator involved minimization of F about $\alpha_o$, but defining the variance of the Barankin estimator includes consideration of the true parameter being estimated, $\alpha_*$. While it is true that $\alpha_*$ is not known, it is practical to include this variable in the theoretical variance development and use the estimate, $\hat{\alpha}_B(X; \alpha_o)$, in its place during evaluation. We start with the definition of variance then substitute Equation-A 7 and simplify to obtain an expression for generalized estimator variance.

$$\text{Var}\{\hat{\alpha}_B(X;\alpha_o)\} = \quad \text{Equation-B 1}$$

$$E\{(\hat{\alpha}_B(X;\alpha_o) - \alpha_*)^2\} = E\{\hat{\alpha}_B(X;\alpha_o)^2\} - \alpha_*^2$$

-continued $$E\{\hat{\alpha}_B(X;\alpha_o)^2\} = E\left\{\left[\alpha_o + \sum_{q'=1}^{Q} \overline{\lambda_{q'}} \cdot \frac{p(X;\alpha_{q'})}{p(X;\alpha_o)}\right]^2\right\}$$

$$\stackrel{def}{=} E\left\{\left[\alpha_o + \sum_{q'=1}^{Q} J_{q'} \cdot \Pi_q(X;\alpha_o)\right]^2\right\}$$

Equation-B 2

Now, expand the argument and take its expectation.

$$E\{\hat{\alpha}_B(X;\alpha_o)^2\} = \alpha_o^2 \int_X p(X;\alpha_o) dX +$$

$$2\alpha_o \cdot \sum_{q=1}^{Q} J_q \cdot \int_X p(X;\alpha_o) \cdot \Pi_q(X;\alpha_o) dX +$$

$$E\left\{\sum_{q=1}^{Q} \sum_{q'=1}^{Q} J_q \cdot J_{q'} \cdot \Pi_q \cdot \Pi_{q'}\right\}$$

Equation-B 3

The second term in Equation-B 3 is obtained by taking the expected value, on both sides, of Equation-A 7 and rearranging terms. Given that by definition the Barankin estimator is unbiased at the tessellation points, the second term of Equation-B 3 is $(\alpha_*-\alpha_o)$.

$$E\{\hat{\alpha}_B(X;\alpha_o)^2\} =$$

$$\alpha_o^2 + 2\alpha_o \cdot (\alpha_* - \alpha_o) + E\left\{\sum_{q=1}^{Q} \sum_{q'=1}^{Q} J_q \cdot J_{q'} \cdot \Pi_q \cdot \Pi_{q'}\right\}$$

Equation-B 4

Substituting Equation-B 4 into Equation-B 1, and simplifying terms, the equation for generalized variance is obtained.

$$\text{Var}\{\hat{\alpha}_B(X;\alpha_o)\} = \sigma^2(\hat{\alpha}(\alpha_o);\alpha_*) = J^+ \cdot \Gamma \cdot J - (\alpha_o - \alpha_*)^2|_{\alpha_* = \hat{\alpha}_B(X;\alpha_o)}$$

Equation-B 5

In practice, Equation-B 5 is evaluated by letting $\alpha_*$ equal $\alpha_B(X;\alpha_o)$. Equation B-5 provides Equation 4 for the Generalized Variance of the Barankin estimate.

$$\Gamma \stackrel{def}{=} e^{\left\{\frac{1}{2\sigma_n^2}\left|\begin{array}{c}4\cdot\text{Real}\{s_{\alpha_o}^+ \cdot (S_q + S_{q'} + S_{\alpha_*} - S_{\alpha_o})\} - 2\cdot\text{Real}\{s_{\alpha_*}^+\cdot(S_q + S_{q'})\} - \\ 2\cdot\text{Real}\{S_q \cdot S_{q'}\} - 2\cdot\text{Real}\{s_{\alpha_o}^+\cdot S_{\alpha_o}\}\end{array}\right|\right\}}$$

dimensions($Q \times Q$)

Equation-B 6

In order to evaluate Equation-B 5 the Lagrangian multipliers are determined by evaluating the tessellation constraints with the Barankin estimator to obtain Equation-B 7. The definition for the auxiliary function G is in Equation-B 8.

$$J = \overline{\lambda_q} \stackrel{def}{=} G^{-1}(\alpha_q,\alpha_{q'}|\alpha_o) \cdot [\alpha \cdot \alpha_o]$$

Equation-B 7

$$G(\alpha_q,\alpha_{q'}|\alpha_o) \stackrel{def}{=} e^{\left\{\frac{1}{\sigma_n^2}\cdot\text{Real}(s_\alpha^+\cdot s_{\alpha_o} + s_{\alpha'}^+\cdot s_{\alpha_o} - s_\alpha^+\cdot s_{\alpha'} - s_{\alpha_o}^+\cdot s_{\alpha_o})\right\}}$$

dimensions($Q \times Q$)

Equation-B 8

Note that '+' represents a conjugate-transpose operator. $\sigma_n$ is the standard deviation of the corrupting AWGN process.

We claim:

1. A computer-implemented method of estimating 3D target information, said computer executing the steps of:
    collecting coherent radar data while flying an aerial platform in a nonlinear flight path with nonzero acceleration out of the slant plane while imaging a ground-based target;
    forming a two-dimensional synthetic aperture radar (SAR) image from the coherent radar data using a phase-preserving technique;
    identifying and masking the ground-based target in the 2D SAR image to identify target pixels;
    establishing a zero height reference plane that supports the target;
    deriving a vector of complex-valued time samples associated with one of the target pixels;
    running a Barankin Estimator on the vector of complex-valued time samples to provide a Barankin estimate $\hat{\alpha}_B$ of a quadratic phase parameter $\alpha$ for the target pixel; and
    scaling the Barankin estimate $\hat{\alpha}_B$ to a pixel height z relative to the zero height reference plane for the target pixel.

2. The method of claim 1, further comprising:
    computing a variance as a closed-form expression of the Barankin estimate $\hat{\alpha}_B$.

3. The method of claim 1, wherein the aerial platform flies the nonlinear flight path making a single pass towards the target.

4. The method of claim 1, wherein the aerial platform's nonlinear flight path exhibits at least minimum threshold acceleration out of the slant plane to induce the quadratic phase parameter $\alpha$.

5. The method of claim 4, wherein the aerial platform's nonlinear flight path subtends at least a minimum polar angle required to achieve a specified SAR azimuth resolution.

6. The method of claim 1, wherein the step of identifying and masking identifies clutter pixels, further comprising:
    processing the clutter pixels to estimate a clutter phase compensation vector and applying the vector to both the clutter pixels and target pixels to establish the zero height reference plane.

7. The method of claim 1, wherein the computer runs the Barankin Estimator on a sequence of target pixels to synthesize a 3D target signature from the pixel heights z.

8. The method of claim 1, wherein running the Barankin Estimator comprises evaluating $$\hat{\alpha}_B(X;\alpha_o) = \alpha_o + \sum_{q=1}^{Q} J_q \cdot \prod_q (X;\alpha_o) \qquad (1)$$

to provide Barankin estimate $\hat{\alpha}_B$, where
    J=Lagrangian Multipliers
    $\alpha_o$=Local Optimization Point (LOP)
    $\Pi$=Ratio of Densities where $\alpha_q$=Tessellated parameter values
    X=Measurements of the vector of complex-valued time samples
    q=Tessellation Index
    Q=Number of Tessellation Points.

9. The method of claim 8, further comprising evaluating $$\sigma_\alpha^2(X;\alpha_o) = J^+ \cdot \Gamma \cdot J - (\alpha_o - \alpha_*)^2|_{\alpha_*=\hat{\alpha}_B(X;\alpha_o)} \qquad (2)$$

to compute a variance of the Barankin estimate, where
    $J^+$=Complex conjugate of the Lagrangian Multipliers
    $\Gamma$=General Auxiliary Function
    $\alpha_*$=dummy variable for the true parameter value $\alpha$.

10. The method of claim 9, wherein running the Barankin Estimator comprises:
- setting upper and lower limits on quadratic phase parameter $\alpha$;
- defining Q tessellation points spaced between the upper and lower limits on quadratic phase parameter $\alpha$;
- calculating a special auxiliary function G and computing its inverse $G^{-1}$;
- adjusting the tessellation points until $G^{-1}$ is stable; and
- evaluating equations 1 and 2 for the Barankin estimate and the variance.

11. The method of claim 1, wherein the Barankin Estimator is applied to multiple unresolved target pixels to generate multiple pixel heights z.

12. The method of claim 1, wherein the aerial platform makes multiple passes along different nonlinear flight paths while imaging the target, said computer processing each said pass to generate pixel heights z and combining the pixel heights between passes to form a final pixel height estimate.

13. The method of claim 1, wherein the computer runs the Barankin Estimator iteratively until reaching a stopping criterion.

14. The method of claim 13, wherein the stopping criteria is a maximum number of iterations or the satisfaction of a convergence criteria by the Barankin estimate $\hat{\alpha}_B$.

15. The method of claim 13, wherein the Barankin estimator provides an approximately local MMSE solution in estimate $\hat{\alpha}_B$, iteration of the Barankin estimator refining the estimate $\hat{\alpha}_B$.

16. The method of claim 1, wherein running the Barankin Estimator comprises:
- setting upper and lower limits on quadratic phase parameter $\alpha$;
- defining Q tessellation points spaced between the upper and lower limits on quadratic phase parameter $\alpha$;
- calculating a special auxiliary function G and computing its inverse $G^{-1}$;
- adjusting the tessellation points until $G^{-1}$ is stable;
- evaluating Barankin Estimator equations as a function of the vector of complex-valued time samples and the estimation parameters to provide the Barankin estimate $\hat{\alpha}_B$; and
- computing a variance of the Barankin estimate.

17. A computer-implemented method of estimating 3D target information, said computer executing the steps of:
- collecting coherent radar data while flying an aerial platform in a single-pass nonlinear flight path with nonzero acceleration out of the slant plane towards a ground-based target while imaging the target to prosecute the target at the termination of the single-pass;
- forming a two-dimensional synthetic aperture radar (SAR) image from the coherent radar data using a phase-preserving technique;
- identifying and masking the ground-based target in the 2D SAR image to identify target pixels;
- establishing a zero height reference plane that supports the target;
- deriving a vector of complex-valued time samples associated with a plurality of the target pixels;
- for each of said plurality of target pixels, iteratively running a Barankin Estimator on the vector of complex-valued time samples to provide a Barankin estimate $\hat{\alpha}_B$ of a quadratic phase parameter $\alpha$ for the target pixel until reaching a stopping criterion; and
- for each of said plurality of target pixels, scaling the Barankin estimate $\hat{\alpha}_B$ to a pixel height z relative to the zero height reference plane for the target pixel to synthesize a 3D target signature.

18. The method of claim 17, wherein the step of identifying and masking identifies clutter pixels, further comprising:
- processing the clutter pixels to estimate a clutter phase compensation vector and applying the vector to both the clutter pixels and target pixels to establish the zero height reference plane.

19. The method of claim 17, wherein running the Barankin Estimator comprises:
- setting upper and lower limits on quadratic phase parameter $\alpha$;
- defining Q tessellation points spaced between the upper and lower limits on quadratic phase parameter $\alpha$;
- calculating a special auxiliary function G and computing its inverse $G^{-1}$;
- adjusting the tessellation points until $G^{-1}$ is stable;
- evaluating Barankin Estimator equations as a function of the vector of complex-valued time samples and the estimation parameters to provide the Barankin estimate $\hat{\alpha}_B$; and
- computing a variance of the Barankin estimate.

* * * * *